United States Patent [19]
Knowles

[11] Patent Number: 5,507,238
[45] Date of Patent: Apr. 16, 1996

[54] REDUCTION OF AIR TOXICS IN COAL COMBUSTION GAS SYSTEM AND METHOD

[76] Inventor: Bruce M. Knowles, 308 E. Orange St., Duluth, Minn. 55811

[21] Appl. No.: 311,343

[22] Filed: Sep. 23, 1994

[51] Int. Cl.⁶ ..................................................... F23G 5/00
[52] U.S. Cl. ........................... 110/245; 110/216; 423/210
[58] Field of Search .................................. 110/245, 216; 423/210

[56] References Cited

U.S. PATENT DOCUMENTS

| | | | |
|---|---|---|---|
| 4,273,747 | 6/1981 | Rasmussen | 423/210 |
| 4,863,489 | 9/1989 | Suggitt | 48/197 |
| 4,889,698 | 12/1989 | Moller et al. | 423/210 |
| 4,932,335 | 6/1990 | Bruckner et al. | 110/245 |
| 5,112,588 | 5/1992 | Staudinger et al. | 423/244 |
| 5,151,256 | 9/1992 | Kato et al. | 423/210 |
| 5,192,517 | 3/1993 | Spink | 423/243.08 |
| 5,270,015 | 12/1993 | Rochelle et al. | 422/168 |
| 5,282,430 | 2/1994 | Nehls, Jr. | 110/345 |
| 5,297,495 | 3/1994 | Weber | 110/346 |
| 5,320,051 | 6/1994 | Nehls, Jr. | 110/346 |
| 5,345,884 | 9/1994 | Vandycke et al. | 110/245 |
| 5,363,812 | 11/1994 | Belin et al. | 110/245 |
| 5,400,723 | 3/1995 | Okuno et al. | 110/235 |
| 5,409,522 | 4/1995 | Durham et al. | 423/210 |
| 5,425,850 | 6/1995 | Tanca et al. | 110/245 |

OTHER PUBLICATIONS

Behavior of Mercury in Hazardous Waste Treatment by Reverse Burn Gasification by McGowin et al., Chemosphere, vol. 27, No. 5, pp. 807–815, 1993.
Comprehensive Assessment of Toxic Emissions From Coal Fired Power Plants, Department of Energy, Contract No. DE–AC22–93PC93255, 1993.

*Primary Examiner*—John T. Kwon
*Attorney, Agent, or Firm*—David George Johnson

[57] ABSTRACT

The present invention provides a system and method (1) for reducing the amount of air toxic elements, particularly mercury (16), in concentrations down to and including trace levels, from a flyash (2) laden combustion gas stream (4). The method includes a step of combusting a fuel (14), often coal or solid waste to form flyash, and a step to concentrate the interaction of the flyash (2) in the combustion gas stream (4) for use as a sorbent.

10 Claims, 1 Drawing Sheet

REDUCTION OF AIR TOXICS IN COAL COMBUSTION GAS SYSTEM AND METHOD

FIELD OF THE INVENTION

The present invention concerns combustion processes. Specifically it concerns the control of emissions from combustion processes such as coal-fired processes or other combustion processes which produce appreciable quantities of solid flyash residue and lesser amounts of volatile noxious species such as mercury in the combustion gas stream. Specific techniques described herein may be used to control the content of such noxious emissions (air toxics) from boiler stacks or other combustion exhausts.

BACKGROUND OF THE INVENTION

Coal is a solid fuel of heterogeneous composition. It is constructed as a mixture of pure hydrocarbons, oxygenated hydrocarbons, complex hydrocarbons with other elements attached, inorganic minerals, and water. Other solid fuels, such as municipal waste, are also usually largely composed of mixtures of complex hydrocarbons, inorganic materials, and water. In some cases, heavy liquid fuels, such as number six fuel oil, and similar fuels, also can be compared to coal chemically and in their combustion characteristics. The present invention includes all such fuels which produce appreciable flyash in their combustion gas steams. Subsequent discussion concentrates largely on a description of coal, but should also be interpreted to include the combustion of any fuel which produces a flyash laden gas stream and which it is desired to remove volatile noxious species, particularly mercury.

The combustion of coal and other similar fuels as currently practiced produces by-products: a combustion gas often primarily composed of nitrogen, carbon dioxide, water vapor, oxygen, and smaller amounts of vaporized inorganic elements and compounds, and inorganic products of combustion (ash). Often the combustion gas carries ash along with it. Combustion gas borne ash is generally known as flyash.

Flyash is usually composed of common oxygenated inorganic compounds made of silica, aluminum, calcium, magnesium, iron, sodium, potassium, titanium, and sulfur. Any of the naturally occurring elements may be found in flyash, but those listed above usually account for more than 90% by mass of commonly occurring flyash, and aluminosilicate and calcium compounds often account for more than 80% of the mass. There are often trace elements contained in the flyash. The trace elements are fundamental constituents of the coal or other fuel, usually not exceeding about 100 parts per million in concentration, and can be nearly any of the remaining natural elements. One of the more common trace elements found in coal and the combustion byproducts of some solid fuels, such as some municpal waste fuels, is mercury.

Three other common properties of flyash found immediately upon its production in a combustion process are: relatively small average particle size (~0.5 μm to ~100 μm), relatively large surface area per particle, and a largely anhydrous condition, all due to the rigor of combustion.

The small average particle size, and large particle surface area yield a very large surface area per unit mass of flyash. As long as the flyash can be maintained in a largely anhydrous condition, the flyash often acts as a sorbent for extremely small particulates, fumes, or vapor phase species which can be sublimated, condensed, or chemisorbed onto or into the flyash particles.

The ability of largely anhydrous flyash to absorb gases or fumes such as vapor phase mercury is not dependent upon the flyash's location in respect to the gas stream containing the mercury. That is, flyash which is being borne by the combustion gas stream can be expected to absorb mercury at rates similar to flyash which is concentrated on the surface of a filter bag as a filter cake. Flyash, which is part of such a filter cake, is very loosely bonded to other flyash particles, and forms a very porous mass. The exposed and available for reaction (activity) surface area of individual flyash particles in such of a filter cake approximates the same as an individual flyash particle which is airborne. The mass to be captured, such as mercury, is often either in a vapor state, where it is at a molecular size, or of a vapor condensed fume, of an often micron, or sub-micron size. Such masses are in gaseous kinetic or Brownian motion, respectively, and "see" very large gaps in even a large accumulation of supermicron size objects as occurs with a flyash filter cake. The ability to trap such material as mercury is not due to the accumulation of flyash acting as a sieve, but due to the high surface area of the flyash to act as sites of condensation, sublimation, or chemisorption.

Although a preferred embodiment of the present invention is the use of flyash which has been modified by capture in a particulate separation device, such as a cyclonic separator, etc., it should also be understood that a reaction agent which mimics the properties of the modified flyash, i.e. particles ranging in size from about 1.0 μm to about 100 μm, having a large surface area per particle due to porosity, and are often largely composed of aluminosilcate mineral phases, can also be used to capture mercury in a combustion gas stream by the present invention. The capture of flyash in a particulate separation device modifies the raw or natural flyash stream by coarsening its particle size distribution. Particles which are less than 1.0 μm are ususally not captured by the particulate capture device.

There has been a growing concern that some trace elements often found in coal, such as mercury, can cause degradation to the natural environment if exhausted unabated during coal combustion to the natural environment. There is current art in capturing mercury and other trace elements during coal combustion, often using activated carbon as the sorbent, but the current art is often too expensive for economic usage.

There is evidence in published literature that flyash can be used as an effective sorbent of some of these trace elements, particularly mercury. First cited is U.S. Pat. No. 4,273,747, Rasmussen, which explains two examples of using flyash to remove mercury from a combustion gas stream. In Rasmussen 747, largely anhydrous flyash incidentally removes mercury from a gas stream through non-deliberate contact, the flyash first contacting the mercury which is borne in a combustion gas stream, and second while the flyash is trapped as a filter cake on the surface of a filter bag. (Rasmussen 747 teaches reducing the temperature of the combustion gas stream to activate the sorption of the mercury vapor onto flyash, and does not discover means to increase the mercury sorption in the "active" zone.) In both cases, the flyash remained largely anhydrous and was described as a dry free flowing powder. Rasmussen 747 reported a nominal 90% reduction in mercury content compared to the base combustion gas. The combustion gas was generated by burning municipal incinerator waste. The combustion gas stream had a relatively high mercury concentration of 100 μg/Nm$^3$.

Second cited is U.S. Department of Energy report, Comprehensive Assessment of Toxic Emissions from Coal-Fired Power Plants, contract No. DE-AC22–93PC93255, 1993. This report indicates that a nominal 60% reduction in mercury content was experienced during normal operating conditions across a baghouse used in industrial application to collect coal produced flyash. In this case, the mercury concentration of the combustion gas stream was a relatively low 6.4 µg/Nm$^3$ (as reported on page ES27). This report states on page ES-24:

"A review of the average inlet and outlet metals emission rates measured using EPA Draft Method 29 indicates greater than 98% removal of all metals through the baghouse with the exceptions of cadmium, selenium, and mercury. On the average, 60% of the total mercury in the flue gas stream was removed by the baghouse. The measured mercury removal determined by EPA Draft Method 29 is supported by the quantity of mercury determined in the corresponding baghouse hopper ash samples obtained for each run. The total baghouse mercury mass emission rate when added to the total mercury mass rate determined for the corresponding bag house ash stream, compared within 2,8, and 23 percent of the total mercury measured in the baghouse inlet flue gas stream using EPA Draft Method 29 for Runs 1,2, and 3, respectively."

Contemporary chemical science teaches that chemical reaction rates are often dependent upon reactant concentrations, with reaction rates initially higher with higher concentrations, then decreasing exponentially with decreasing reactant concentrations. Thus, the different removal efficiencies of the two examples cited above are to be expected based on conventional knowledge. In fact, the manipulation of concentrations and contact times of the flyash and mercury as reactants in novel methods is a central feature of the current invention.

A baghouse is a commercially available device used to separate particulate material from gas streams at industrial scales of operation. Baghouses use a collection of often fabric filters, similar to common household vacuum cleaners, but at a much larger scale, to strip gas borne particulate matter onto a filter surface, allowing the largely particulate-free gas to continue through the filter surface.

During operation of the baghouse particulate matter builds up on the surface of the filter(s). This build-up is commonly known as the bag's "cake." Cakes are frequently allowed to build up to thicknesses of approximately 0.25 inch or somewhat more between intervals of cleaning.

Bags in operational baghouses are cleaned of cake buildup at periodic intervals: determined by variables of operation and engineering design. The cleaning process often involves blowing air backwards through the bag filters, or shaking bags, or banging the tops of the bags, all of which cause a substantial portion of the filter cake to drop off of the bags. This causes a periodic subsidence in the thickness of the filter cake.

That a reduction of 60% in mercury content can be achieved with a contact time as short as experienced in the gas/filter bag interface (estimated to be roughly four milliseconds: assuming a superficial velocity of five feet per second, and a filter cake of 0.25 inch yields a contact time of: T=(0.25/12)/5=0.004 seconds.), is indicative of the effectiveness of largely anhydrous flyash as a sorbent of mercury and other trace elements.

Chemical reactions involving the interaction of a dilute reactant often utilize the concept of a "$CT$" value, where $C$ is a relative concentration value, and $T$ is a measure of time. The product of $C$ times $T$ yields a measure of the relative reaction, based upon the normal linearity of reaction rate constants found in reactions where at least one reactant is dilute.

The concentration of mercury can be considered relatively constant for a given coal source and under normal combustion conditions. In order to decrease the amount of mercury released to the environment in the combustion gas stream, increases are needed in the contact time $T$, and the concentration of the other reactant, flyash, expressed as $C$, i.e., increases in the $CT$ value would be expected to increase the amount of mercury sorbed onto/into the flyash.

Thus, what is needed is a process and/or apparatus which allows significant increases in the $CT$ value of a practical and economic nature, particularly using a largely anhydrous flyash as the sorbent.

Current art in mercury sorption often uses activated carbon (or coke) as the sorbing reactant. There are at least three activated carbon/coke based technologies in current art which remove air toxics. They are the Joy/Niro spray dryer adsorption system, the System Düsseldorf, and the GE-Mitsui-BF dry $Deso_x$/$DeNO_x$/Air Toxics removal process. In most of these applications, the mercury-containing combustion gas is forced through a deep bed of activated coke: activated coke is just an "industrial" version of activated carbon. True activated carbon is expensive stuff which finds application in every thing from pharmaceuticals to potable water systems. Activated coke is still quite expensive (about 20% the cost of activated carbon), its current market price is about 1,000 per ton. Activated carbon and activated coke both have some physical properties similar to flyash, primarily a large surface area per unit mass. The large surface area is due to a micropore structure present in activated carbon, which acts as a sublimation or chemisorption surface and/or molecular sieve. The ability for flyash to similarly act as an effective sorbent is likely due to these physical similarities.

The use of activated carbon/coke, however, suffers from significant drawbacks:

1. Activated carbon/coke is expensive. The current market for activated carbon at an industrial scale is between 1,000 to 5,000 per ton. This results from an expensive attritive process used in the manufacture of the activated carbon/coke, as well as the cost of the process feed stock, which is often an expensive coking coal.

2. Substantial pressure drop reduces plant efficiency. In order to obtain effective mercury reductions (which equates to adequate CT values), the relatively large depth of the bed of activated carbon/coke often results in substantial pressure drop of the combustion gas through the bed, which necessitates increased fan power, which reduces the net efficiency of the coal combustion system.

3. Mechanical weakness of activated coal/coke and concomitant problems. Many of the activated carbon/coke processes use "lump" sizes (excluding Moller, etal, 698). Lump sized activated carbon/coke uses an average particle size approximately one inch (2.5 cm). Because activated carbon/coke sorbs mercury from the combustion gas stream, it must be periodically replaced. Activated carbon/coke are fragile solids, and during the mechanical handling associated with replacement are subject to breakage. This problem is inconsequential with sorbent flyash, which remains as readily fluidized, small particulate matter.

4. Inefficient utilization of reactant. Because of the high cost of activated carbon/coke, the entire process must be designed to minimize the loss of sorbent, thus abrogating the possibility of using very fine (and thus ultra-high surface area) particulate. This increases the required mass of sorbent: and cost.

The use of a flyash based sorbent system can be designed to have none of the above limitations. Since flyash is generated on site as a fundamental property of coal combustion (and flyash is also generated by the combustion of other fuels with significant inorganic content), its availability is nearly infinitely more economic than activated carbon/coke. This fact allows the development of a mercury sorption system which is simple, practical, economic, and innovative.

Different types of fuels exhibit different levels of mercury concentrations. Some municipal and medical waste incineration systems are known to generate mercury concentrations in the combustion gas stream of about 100 µg/Nm$^3$. This places different constraints on the type of mercury sorption system which can be used. Combustion of coal often contains a small fraction of mercury present in many municipal waste combustion streams, (in many cases about 5% of that found in some municipal waste combustion streams). As a result, and partly because mercury concentration in coal combustion systems have been at the limit of detectibility, more expensive systems (i.e. activated carbon/coke) for mercury sorption have found practical application in municipal waste incinerators, but are only in limited use for larger industrial scale coal combustion systems. What is needed is a practical, economic means of removing mercury from low concentration (i.e. industrial coal) combustion gas streams. When such a method becomes available, it can be extended even more economically to high mercury (i.e. municipal waste) concentration systems.

The current invention is a practical, economic means of removing mercury from low mercury concentration combustion gas streams. An improvement in the art of mercury sorption in coal based combustion gases is described in the summary of the invention.

U.S. Pat. No. 5,270,015 Rochelle, etal., teaches a method for the removal of sulfur and acid components from a flue gas stream. Alkali components which can include flyash are extracted from the gas stream by an ash collection device and mixed with water to create a slurry composed of water and alkali solids. The use of water to create a slurry is an essential part of Rochelle, 015. The present invention does not use water in the process. The present invention is limited to largely anhydrous flyash or similar particulate matter, in order to have its activity as high as possible. Activity in this case is related to reaction surface area for a gaseous/solid reaction. Any appreciable moisture content reduces available surface area for mercury removal.

U.S. Pat. No. 4,863,489, Suggitt teaches a method for the removal of mercury from a synthesis gas stream using a pressurized solvent scrubber: mercury is condensed and washed from the gas stream. Further, Suggitt, 489 does not use largely anhydrous flyash as a reactant. The current invention does not propose to remove mercury or mercury compounds from a synthesis gas stream, but is limited to combustion gas streams, specifically flyash laden combustion gas streams.

U.S. Pat. No. 4,889,698, Moiler, etal, teaches a method for the removal of mercury and noxious polyorganic matter by the use of a suspended powdery activated carbon in a combustion gas stream. The present invention avoids the use of powdery activated carbon and obtains the satisfactory removal of mercury by discovering methods that engineer the contact of largely anhydrous flyash with the mercury laden combustion gas. The use of flyash is preferred over Moller 698 due to its practicality and economy.

Rasmussen, U.S. Pat. No. 4,273,747, teaches a method for the removal of mercury from a flyash laden combustion gas stream which uses the atomization of water to depress combustion gas temperature. In Rasmussen 747, the mercury is removed by combustion gas suspended flyash, but through incidental contact. The reason Rasmussen 747 depresses the combustion temperature is to place the reactants in a thermodynamic regime which favors increased reaction rates. The present invention could be used in conjunction with Rasmussen 747, without intersection of concept boundaries. Rasmussen 747 teaches the depression of combustion gas temperature, whereas the present invention teaches new methods of engineering the contact of flyash to satisfactorily remove mercury. The concept of using the flyash as a primary discovery was not claimed by Rasmussen 747. The present invention does not claim to protect the discovery of flyash as a mercury sorbent, since this was clearly disclosed by Rasmussen 747 in 1981. But, engineering the controlled removal of mercury by contact with flyash through a novel process, and specific embodiments described in detail, are claims of the current invention.

DESCRIPTION OF THE INVENTION

Figure 1:
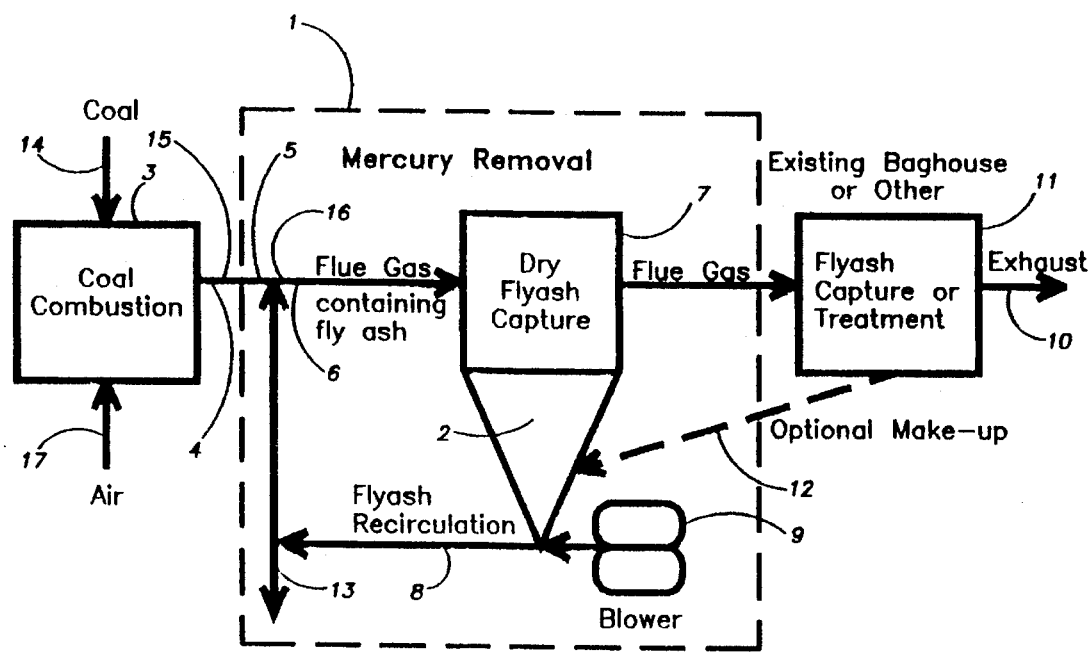
FIG. 1 shows a view illustrating an embodiment of the present invention.
Figure 2:
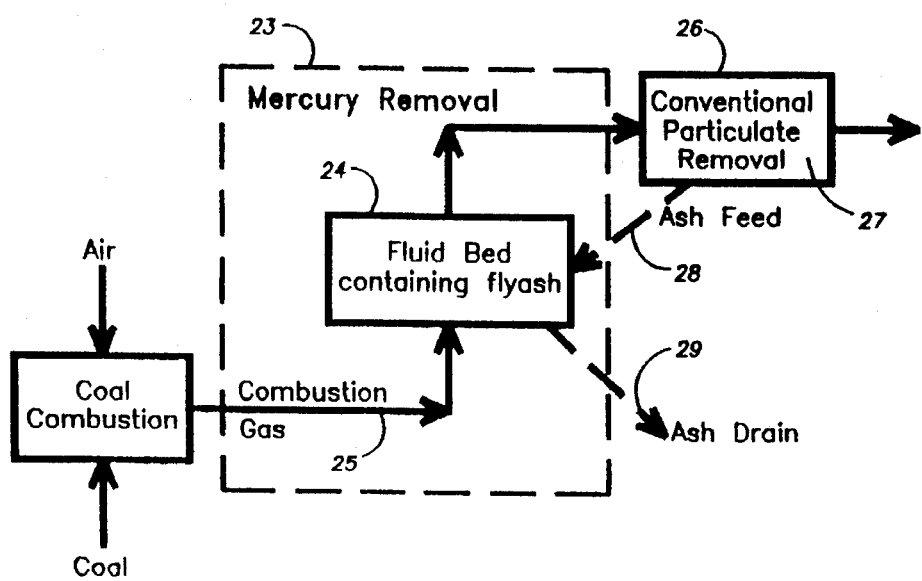
FIG. 2 shows a view illustrating an embodiment of the present invention.

An economic and novel means of removing substantial and controlled amounts of mercury from a coal based combustion gas stream is to provide a flyash/gas stream contacting system which offers substantial improvement over existing art. Existing art can be defined as a current commercial baghouse system operated in a temperature regime of 100° C. to 200° C. as the best current method for contacting largely anhydrous flyash with a coal-based combustion gas stream. In this case, mercury sorption occurs incidentally, and not by engineering design. Rasmussen 747 teaches the temperature dependence of mercury/flyash reaction, and indicates that an optimum temperature is approximately 150° C. Temperatures largely above 200° C. tend to reduce the reaction efficiency, and temperatures below 100° C. are not economic to achieve with combustion exhaust systems.

It is possible to increase the mercury sorption in a flyash based contact system by increasing the number of encounters in a baghouse system, i.e., by having multiple passes at series encountered filter bags, but flyash would have to be specifically introduced into a clean gas system, and this could easily double the cost of an existing gas clean up system. Another method may be to greatly/increase the size of a single pass baghouse, thus reducing the superficial velocity through the bag house and increasing the $T$ value in the $CT$ product. This, however, also results in greatly oversizing the need for a current baghouse system, and also would dramatically increase the installed cost and operating cost of such a system.

A better and more practical solution would be to recycle a portion of flyash back into the combustion gas stream upstream of a particulate collection device, which could be an existing baghouse, or other dry means of particle capture.

Recirculation of flyash back into the combustion gas stream will increase the total process interaction of flyash and mercury containing combustion gas, and will increase both concentration and time values of the mercury/flyash reaction. Additional CT values resulting from the recirculation of flyash will result in increases in mercury removal over and above what is removed in the existing particulate capture device. This can be done, and should be considered as one embodiment of the current invention.

However, a preferred embodiment of the present invention is to introduce a new process element upstream from existing particulate collection systems.

The preferred location for the mercury sorption system is in the combustion gas path, where the combustion gas is preferably between about the temperatures of 100° C. (212° F.), and 200° C. (392° F.). In a conventional industrial scale boiler, this temperature regime often exists after a heat exchanger where the combustion gas is indirectly cooled by incoming combustion air, and before the existing particulate collection system. As an example, some typical dimensions are given which may be found in coal combustion systems: The combustion gas duct work can be ten feet by ten feet in cross section, with a combustion gas velocity of ten feet per second. The linear distance between the combustion gas cooler and the particulate collection device may be one hundred and fifty feet. The existing particulate collection device has an efficiency exceeding 99%. Inserting a particulate extraction device, in this case a cyclone, with a 90% separation efficiency just before the existing particulate collection system allows a flyash recirculation pathway of one hundred and fifty feet. The combustion of coal produces 100 lbs/min of flyash. These values can be taken as typical for a coal fired electric steam electric station of 70 MegaWatt capacity. Given a recirculated flow of flyash, from the cyclone to its reinsertion point just after the combustion gas cooler, of Q=500 lbs/min, the concentration value $\underline{C}$ can be calculated.

The reaction zone is the 150 foot long duct which contains the 100 lbs/min of combustion flyash, plus the 500 lbs/min of recirculated flyash. The reaction volume is the area times the gas velocity flow rate:

M=mass flow=(500+100)=600 lbs/min, or 10 lbs/sec

V=volume flow=10 ft×10 ft×10 ft/sec=1000 ft$^3$/sec $\underline{C}$=concentration=mass flow/volume=(10 lbs/sec)/1000 ft$^3$/sec=0.010 lbs/ft$^3$ The reaction time $\underline{T}$ in the reaction zone can be calculated from the combustion path length and combustion gas velocity.

L=path length=150 feet v=gas velocity=10 ft/sec $\underline{T}$=reaction time=L/v=150/10=15 seconds The reaction rate value $\underline{CT}$ is the simple product of the individual $\underline{C}$ and $\underline{T}$ values:

$\underline{CT}$=0.010×15 =0.15

Currently, the $\underline{CT}$ for reaction across a filter bag surface is estimated to be 0.06. This is calculated from an estimated concentration of flyash at the bag surface of 15 lbs/ft$^3$, and a reaction time based on an estimated path length of 0.25 inch (0.021 ft), and a gas velocity of 5 feet per second. Or, $\underline{C}$=15 lbs/ft$^3$ $\underline{T}$=0.021 ft/5ft/sec=0.004 seconds=4 milliseconds $\underline{CT}$=15×0.004=0.06

As can be seen from the calculation, it is relatively easy to double the $\underline{CT}$ value compared to combustion gas flowing through a baghouse. In order to estimate the mercury removal, compared to the published data of 60% removal across a baghouse, the following concentration reactions are calculated. Since the mercury content is dilute, the reactions follow simple single order concentration reactions, given by:

[Hg]=Ae$^{-\underline{CT}}$, where

[Hg] is the concentration of mercury (relative value), A is a proportionality constant, and $\underline{CT}$ is the reaction constant.

Solving this equation for the 60% removal of mercury across the filter bag yields the following value for the proportionality constant, A.

A=(1−60%)/e$^-$0.06=0.4/0.94=0.42

Substituting the recirculated flyash $\underline{CT}$ value of 0.15 into the above equation yields the following results:

[Hg]=0.42e$^-$0.15=0.42×0.86=0.36

This indicates that, all other things being equal, a mercury removal of 64% would be expected with a recirculated flyash system, an improvement over the incidental removal by the fabric filter. Further increases in mercury removal can be obtained by using higher flyash recycle ratios, and longer residence times. For instance, operating a recycle rate of 5000 lbs/min in the above example increases the $\underline{CT}$ to 1.5, which corresponds to a mercury reduction of 90%. In this embodiment, the equipment corresponds more to that of a circulating fluid bed application. A circulating fluid bed for the purpose of this discussion is essentially a hybrid between a simple flyash recirculation system and a bubbling fluid bed.

It is clear, however, that using an ash recycle system in applications where economy and simplicity of installation are paramount, substantial mercury removal can be very cost effectively accomplished. Such systems may find application upstream from existing electrostatic precipitators, or wet scrubber systems, where little or no mercury removal can be expected.

In applications where an ash recycle system is used in front of a baghouse, the $\underline{CT}$ values would combine, producing greater mercury removal. Combining the two examples above yields a $\underline{CT}$ of 0.15+0.06=0.21. This yields a mercury removal of 66% for the combination. Mass balance for the flyash recycle system: flyash fresh from coal combustion enters into the reaction zone at 100 lbs/min, and joins with the 500 lbs/min being recirculated. This creates a mass flow in the reaction zone of 600 lbs/min. The flyash leaves the reaction zone at the cyclone, which has a separation efficiency of 90%. The cyclone collects 540 lbs per minute, and passes 60 lbs/min of flyash with the combustion gas stream. The recycle system at the cyclone's base returns 500 lbs/min to the beginning of the reaction zone. This leaves 40 lbs/min which are disposed of in an existing ash handling system.

In a recirculating system with 5000 lbs/min mass flow, the cyclone captures 90% (4,500 lbs/min), and passes on 500 lbs/min with the combustion gas stream. Since there is only 100 lbs/min influx of new flyash from the combustion process, there must be flyash added from another source. In this case, there would likely be provisions to "make-up" flyash flow from the downstream ash collector device.

One learned in the art can clearly see that by controlling the amount of make-up to the recycle from a downstream source, and designing the recycle system for sufficient robustness, the amount of mercury reduction can be controlled to a desired level.

Again, such a system would be very economical to construct.

General design information for a bubbling fluid bed based flyash system is supplied, Using shared information from the example above can be instructive. The density (concentration) of fluidized flyash in a bubbling fluid bed is estimated to be 15 lbs/ft$^3$. Since the same turbulent mixing occurs in a fluid bed as in turbulent gas flow, the same $\underline{CT}$ relationship should be valid. In fluid beds with mean particle sizes of about 10 μm, a superficial gas velocity of 3 feet per second is common. Using a bed depth of 1.5 feet, yields a residence time of 0.5 second. Calculating the $\underline{CT}$ value:

$$\underline{CT}=15\times 0.5=7.5$$

Using the same concentration relationship developed above yields a mercury reduction of:

[Hg]=0.42e$^{-7.5}$=2.32×10$^{-4}$. This corresponds to a mercury reduction in excess of 99%.

A flyash filled bubbling fluid bed can be a very effective device for removing mercury from combustion flue gas. Such a device would however have the relative drawback of being substantially more expensive to construct than a simple recirculating cyclone. Because of the relatively low velocities in the bubbling fluid bed (needed to keep from blowing the flyash out of the bed), the cross sectional area of the fluid bed would have to be relatively large. However, in applications where a premium is placed on mercury removal, the bubbling fluid bed may be the best embodiment for the purpose.

DESCRIPTION OF THE DRAWINGS

A more complete understanding of the invention may be had by reference to the accompanying schematic drawings which shows an embodiment of the previously described process in detail.

The process diagram of FIG. 1 identifies the means 1 of removing mercury 16 from a flyash laden combustion gas stream. Coal 14 or other fuels containing significant inorganic material, is burned in a combustion chamber 3. The byproducts of combustion in chamber 3 is a combustion gas stream 4 which travel through a conduit 15. The combustion gas stream contains flyash 2 and mercury 16, in addition to the normal gaseous constituents of combustion. The means 1 of removing mercury is placed preferentially in the combustion gas stream 4 where the temperature of said combustion gas stream 4 is between 100° C. and 200° C. The means includes capturing flyash 2 following combustion in a combustion chamber 3 while it is entrained in the post-combustion gas stream 4. The use of a particulate capture device 7, specifically designed for the type of capture desired, which could often be a cyclonic separator 7, can minimize the energy requirement of the system, and be designed for relatively large flyash 2 mass flows, with a minimum of maintenance and operating cost. Flyash 2 that has been captured is then continuously recirculated through piping 8 to an up-stream location 5 in the same post combustion gas flow 4 from which it was extracted, and is reinjected at the site 5. The motive force for the flyash 2 recirculation can be a blower 9. The blower 9 can take its suction from the combustion gas stream 10, or from ambient air, if it is desired to reduce the combustion gas temperature 4 into the preferred range. It will most often be found desirable to position the recirculation injection point 5 as far upstream as practical from collection device 7, to provide the longest contact time in reaction region 6 as the reinjected flyash 2 returns to cyclone 7. Usually, an additional particulate collection device 11, or other treatment 11, such as desulfurization 11, will be used downstream from the mercury removal method and device 1. Flyash 2 purity and total recirculated flyash 2 mass can be controlled by blowdown pipe 13. Reaction region 6 can be a conduit or pipe of any spatial orientation, i.e. vertical, horizontal, etc., as long as the combustion gas stream 4 is sufficiently high in velocity to maintain fluidization of the flyash 2. A vertical orientation of the reaction region 6, in which the direction of flow is substantially upward, and relatively large mass flows of recirculated flyash 2 describes a preferred embodiment of the current invention, frequently called a circulating fluidized bed.

In common industrial combustion systems, there is often a mechanical heat recovery exchanger which indirectly cools the combustion gas stream temperature into the 250° C. to 400° C. range. Since large increases of ash mass flow upstream from this mechanical heat exchanger could result in abrasion damage, just downstream of such a device may, in many cases, provide the most practical location for the flyash re-injection point 5.

Since the flyash 2 was initially carried by the gas stream, when the recirculated flyash is re-injected at 5, if it is properly fluidized upon re-injection, it will become combustion gas borne again. This comes from the reasonable assumption that the coal combustion system 3 is operating normally, so that the combustion gas velocities in line 4 are at normal levels. This allows relatively high mass flows of ash 2 to be recirculated without ash "settling out."

It may be found desirable, in at least some applications, to provide a means 12 of adding flyash 2 to the recirculation system from the downstream particulate capture device 11, in order to make up losses to the recirculation system. That is, should a device such as a cyclone be used as the primary recirculation device, it would be common practice to have another particulate capture device 11 such as a baghouse 11, or electrostatic precipitator 11, downstream from the cyclone 7 to increase the total particulate capture efficiency (cyclones generally are about 90% efficient, baghouses and electrostatic precipitators can be above 99% efficient). In cases where the recirculated flyash 2 mass flow is high enough for the normal pass through of a cyclone 7 exceeds the normal rate of flyash generation in the coal combustion process, it may be found desirable to make-up (add) flyash 12 to the recirculation system in order to maintain equilibrium mass flows.

In another preferred embodiment to the invention 23, it may be found in some cases, particularly in cases that it is desirable to remove larger quantities of mercury, that the use of a flyash filled bubbling fluid bed 24 may replace the use of a flyash circulation system. In this embodiment, a fluid bed 24 would be inserted in the normal combustion gas flow path 25, prior to a particulate collection system 26, which could often be a baghouse 26, electrostatic precipitator 26, etc. Flyash 27 captured in the normal particulate collection system 26 would be used to fill the fluid bed 24 with flyash 27 through pipe 28, and if necessary, to maintain its level and replenishment with flyash 27. The fluid bed 24 would also be equipped with a drain 29 to allow flyash 27 to be removed as needed to maintain level and purity.

In some applications, the fluid bed 24 may capture enough of the flyash 27 incoming with the combustion gas in gas stream 25 to maintain its own level. In this case, initial filling of the fluid bed 24 could come from the conventional particulate removal system 26 through pipe 28, or other sources, and the fluid bed 24 would drain flyash 27 into an existing ash removal system through drain pipe 29.

I claim:

1. A system for reducing amounts of toxic elements in a gas stream, comprising:

(a) a combustion chamber, the combustion chamber serving as a site for combusting fuel and air and thereby producing the gas stream;

(b) an exhaust conduit, the exhaust conduit being affixed to the combustion chamber, the exhaust conduit defining a path along which the gas stream exits the combustion chamber;

(c) a particulate entraining device, the particulate entraining device being affixed to the exhaust conduit such that all of the gas stream exiting the combustion chamber enters the particulate entraining device, the particulate entraining device capturing a portion of particulate material contained within the gas stream; and (d) a feedback conduit, the feedback conduit being affixed to the particulate entraining device, the feedback conduit being interconnected to the exhaust conduit such that a portion of the particulate material is reintroduced into the exhaust conduit, the particulate material tending to bond with at least some of the toxic elements within the gas stream.

2. The system of claim 1, further comprising a blowdown pipe, the blowdown pipe being interconnected at a junction between the exhaust conduit and the feedback conduit, the blowdown pipe thereby providing an alternate path for particulate material within the exhaust conduit, the blowdown pipe thereby serving as a means for regulating quantities of particulate material reintroduced into the exhaust conduit from the particulate entraining device.

3. The system of claim 2, further comprising a blower, the blower being interconnected to the feedback conduit at a junction between the particulate entraining device and the feedback conduit, the blower urging the particulate matter toward the exhaust conduit.

4. The system of claim 3, further comprising an exit conduit, the exit conduit have an upstream end and a downstream end, the upstream end being interconnected to the particulate entraining device.

5. The system of claim 4, further comprising a particulate matter treating device, the particulate matter treating device being interconnected to the downstream end of the exhaust conduit.

6. The system of claim 5, wherein the exhaust conduit has a longitudinal axis, the longitudinal axis being oriented in a substantially vertical direction.

7. The system of claim 6, wherein the particulate material is composed substantially of flyash.

8. The system of claim 7, wherein the combustion gas stream has a temperature in the range of 100° C. and 200° C.

9. The system of claim 8, further comprising a makeup conduit, the makeup conduit having an upstream inlet and a downstream outlet, the upstream inlet being interconnected to the particulate matter treating device, the downstream outlet being interconnected to the particulate matter entrainment device.

10. The system of claim 9, wherein the particulate matter treatment device comprises an outlet port, the outlet port being interconnected to atmospheric pressure.

* * * * *